Figure 1:
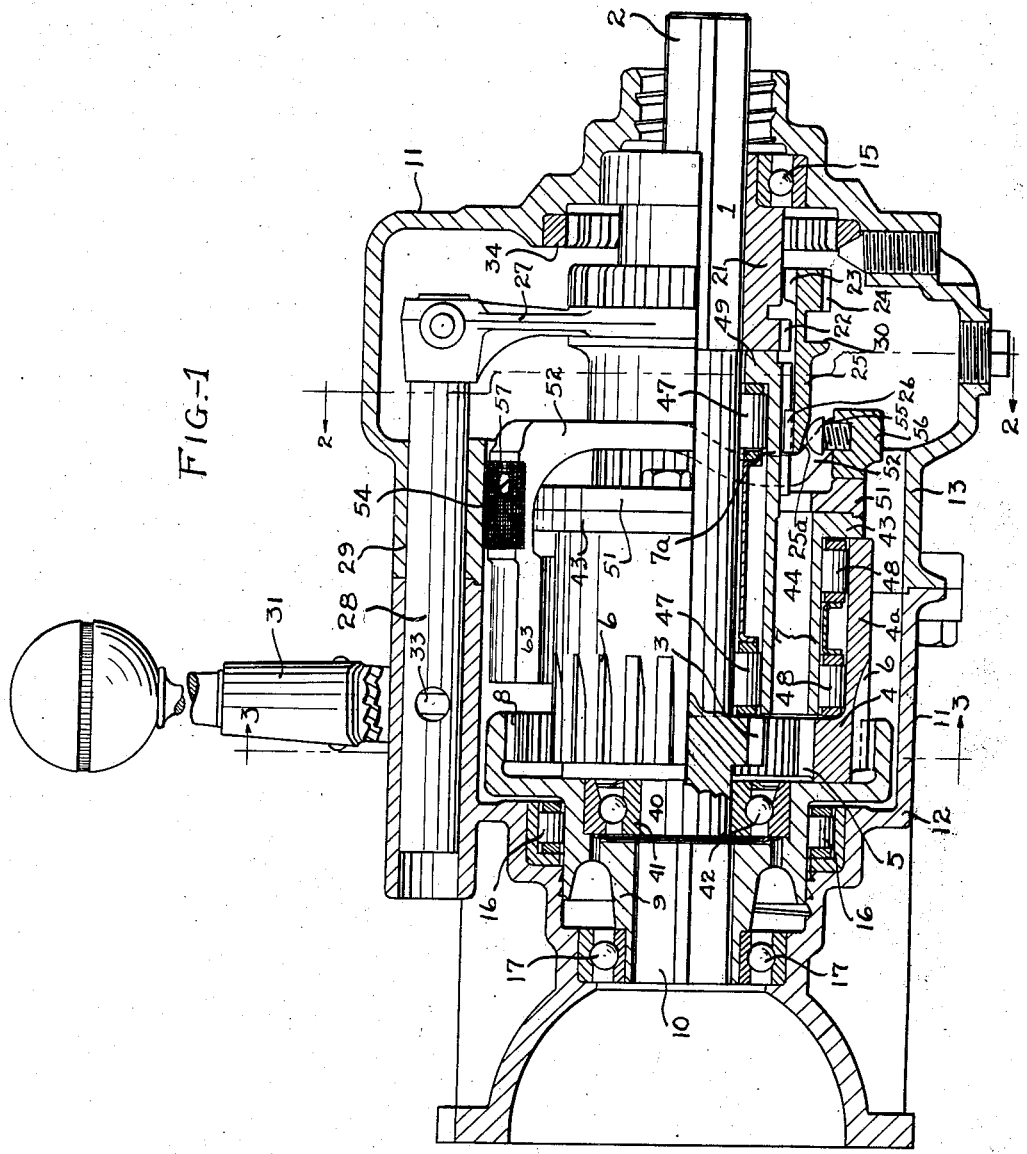

June 28, 1927.

C. E. F. AHLM 1,634,063

TRANSMISSION GEARING

Filed Oct. 16, 1924

2 Sheets-Sheet 1

Inventor

Charles E. F. Ahlm,

By Bates, Macklin, Toldrich & Teare

Attorneys

June 28, 1927.

C. E. F. AHLM 1,634,063

TRANSMISSION GEARING

Filed Oct. 16, 1924   2 Sheets-Sheet 2

Inventor
Charles E. F. Ahlm,
By Bates, Macklin, Goldrich, & Teare
Attorneys

Patented June 28, 1927.

1,634,063

UNITED STATES PATENT OFFICE.

CHARLES E. F. AHLM, OF CLEVELAND, OHIO.

TRANSMISSION GEARING.

Application filed October 16, 1924. Serial No. 743,911.

This invention relates to automobile transmission gearing wherein a driving member may be connected to a driven member either directly or at a reduced speed. The embodiment shown is adapted to effect either a direct drive or a single speed reduction through the agency of a circulating and revolving eccentrically mounted gear member having external and internal gear teeth, the internal teeth being adapted to mesh with the pinion on the driving member and the external teeth with an internal gear on the driven member. The synchronous rotation of two members is effected by locking the internal gear against circulatory movement through causing a rigid connection of the eccentric bearing with the driving member. Such a mechanism as above outlined is shown, described and claimed in a prior application filed by me June 30, 1924, Serial No. 723,153. In this application I also show a means for bringing the driving and driven members to the same speed by a centrifugal friction brake, previous to drivingly connecting the members by a dental clutch and means for neutralizing this braking action before the members are again connected at a different speed. The centrifugal brake member is secured to the eccentric bearing, and by reason of the center of gravity of this bearing being offset from the axis of rotation of the driving shaft, when the bearing is rigidly connected to this shaft and rotated for effecting direct drive, the rotating unit so formed (being unbalanced) has a tendency to vibrate when rotating. One of the primary distinguishing characteristics of this invention over the one above referred to is that a substantial counterweight is carried by the centrifugal brake in a position overhanging the eccentric bearing and in opposition thereto respecting the center of rotation of the unit. It results that when in rotation the center of gravity of the whole unit is practically coincident with the axis of rotation of the drive shaft, resulting in a stabilized and consequently more durable and quietly operating mechanism.

The primary object of the invention, therefore, is the provision of a transmission gearing having internal external gears mounted on an eccentric, which eccentric is at times caused to rotate and wherein the dynamic unbalance of the mechanism due to the rotating eccentric is corrected. More specifically it is an object to provide a centrifugal brake for producing relative synchronization of a pair of relatively rotating members, with an overhanging counterweight, said counterweight substantially balancing the eccentric parts.

A further object is the provision of a very compact, and easily assembled single reduction gear unit adapted to be easily installed in connection with an already existing transmission, and which by reason of its compactness is adapted to be operated from the driver's position by a simple form of shifting lever.

Other objects will become apparent in the further and more detailed description pertaining to the accompanying drawings, wherein I have illustrated the preferred form of my invention. The essential novel characteristics will be summarized in the claims.

Figure 2:
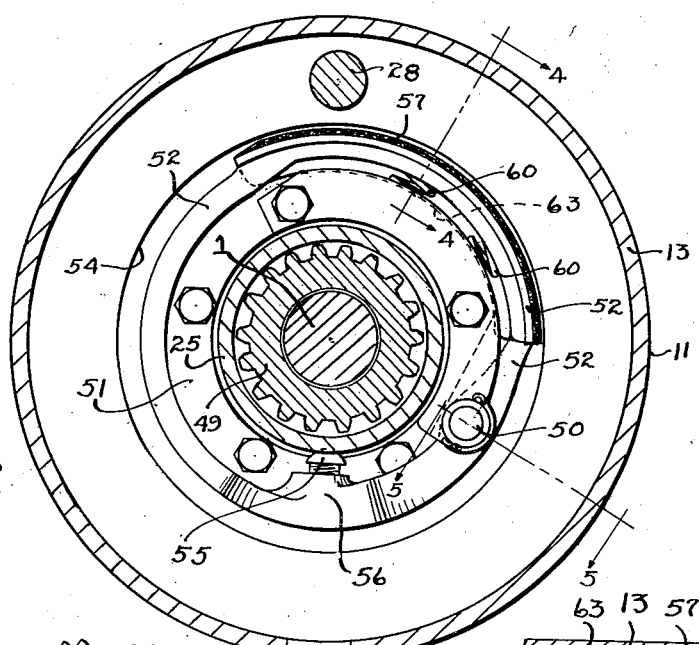
Figure 3:
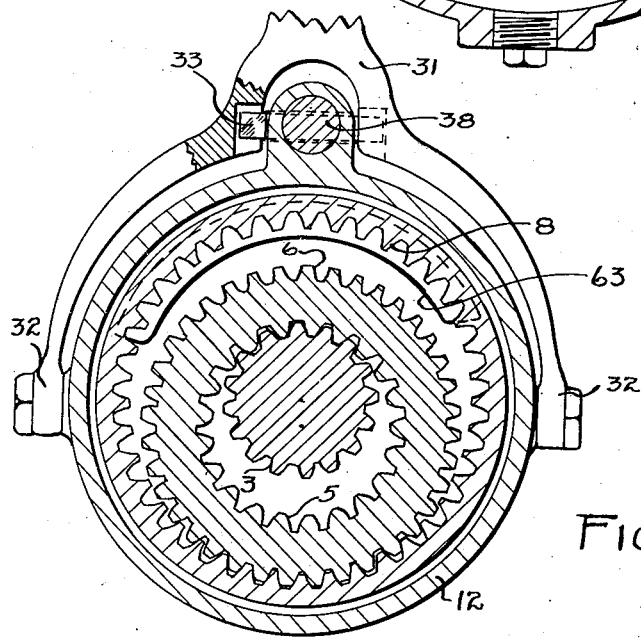
Figure 4:
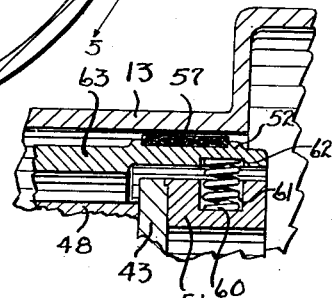
Figure 5:
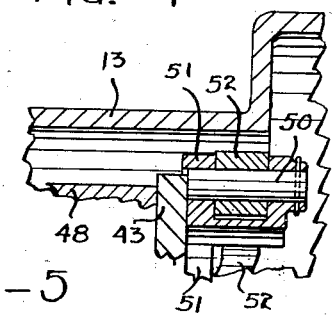

In the drawings, Fig. 1 is a substantially central longitudinal section through my gearing, showing certain portions of the mechanism in partial elevation; Fig. 2 is a transverse cross-section taken along the line 2—2 of Fig. 1; Fig. 3 is a transverse cross-section taken along the line 3—3 of Fig. 1; Figs. 4 and 5 are detailed cross-sections taken along the lines 4—4 and 5—5 of Fig. 2.

Referring to the drawings in detail and by the use of reference characters, 1 indicates the driving member having an angularly formed forward end 2, adapted to engage the driving member extending from an already existing transmission. The driving member has on its rearward end a pinion 3, the teeth of which engage internal teeth on a revolving and circulating gear 4, having internal teeth 5 and external teeth 6. This gear is mounted on an eccentric bearing 7. The external teeth engage gear teeth 8 of an internal gear suitably supported and rigid with the driven member of the gearing, integral therewith in the embodiment shown. This driven member indicated at 9 has an angularly formed opening 10 similar to that of the driving member extending from the already existing transmission whereby to connect my mechanism with the rear axle, it is only necessary to shorten the already existing torque tube and propeller shaft.

The mechanism just described is suitably mounted in a casing 11 formed of separate parts 12 and 13 to facilitate the assembly of the mechanism into the casing. The casing is provided with a roller bearing 15 at its forward end for supporting the driving shaft and at its rearward end with the bearings 16 and 17 for supporting the driven gear member. Keyed, or otherwise rigidly secured, to the forward end of the drive shaft, I have shown a sleeve 21 having a reduced forward end engaging the inner race of the bearing 15, the forward end of the sleeve carrying external teeth 22. The rearmost end of the driving member 1 is provided with a projection 40 which carries a bearing race 41 of a roller bearing 42, which bearing is supported by the gear 8. The eccentric bearing 7 for the circulating gear is shown as flanged at its rearward end at 43 and open at 44 to reduce its weight.

For supporting the eccentric bearing member so that it may be rotated with or remain stationary relative to the drive shaft 1, I peferably provide separated roller bearings 47 held against longitudinal displacement by an inturned portion 49 of the eccentric. The compound gear 4 has a bearing sleeve 4ª embracing the bearing, rollers 48 interposed between this and the cylindrical outer surface of the bearing 7.

I have arranged for frictionally connecting the eccentric to the casing as well as for positively connecting it thereto by means of clutch teeth. The mechanism for effecting the frictional connection includes the flange 43 to which is secured an annular member 51. Pivoted to this annular member at 50 as shown in Figs. 2 and 5 I have shown a brake arm 52 which is provided at 53 with a suitable friction shoe 57 adapted to engage the cylindrical inner surface of the casing at 54. The arm 52 is preferably made continuous for strength consistent with lightness of construction. The overhanging counterweight is shown at 63 as rigid with this arm.

Referring to Figs. 1 and 2 it will be seen that this clutch arm is shown as provided with an adjustable projection 55 which is threaded into a boss 56 on the arm. This cooperates with a clutching member which I will now describe in connection with the means for positively connecting the driving and driven members together at different speeds.

Partially supported by the circular portion 21 of the sleeve 20, I have shown a longitudinally movable cylindrical gearlike clutch member 25 having internal teeth 23 and external teeth 24 at one end, and having a splined support at 26, on a forwardly extending portion 7ª of the eccentric bearing. The rear end of this member 25 is beveled at 25ª and engages the projection 55 to withdraw the friction brake to inactive position. The usual clutch rings 30 are shown as engaged by a shipper arm 27 which has a shank 28 extending into a bearing 29 therefor in the casing.

The means for operating this shipper member preferably comprises a trunnioned lever 31 pivoted at 32 at either side of the casing and having a slot and pin connection 33 with the shank 28 of the shipper member.

It will be seen that the clutching member 25 may be shifted rearwardly so that the teeth 23 are in engagement with the teeth 22, thereby rigidly connecting the driving member with the eccentric bearing, or it may be shifted forwardly so that the teeth 24 engage internal teeth on a relatively stationary toothed ring 34 secured to the casing. In the former position of the clutch 25, relative rotation is prevented between the driving gear 4 and the pinion 3, and therefore the external gear 7 is held rigid with the driving shaft and a direct drive is imparted to the driven member 9. When shifted to the other position, the compound gear member 4 is allowed to circulate about the then stationary eccentric bearing at a reduced speed, depending upon the ratio of the pinion to the gear 5, while due to this circulating and revolving motion of the gear 4, the gear 8 is driven at a still further reduced speed depending upon the ratio of the gears 6 and 7. In the position shown in Fig. 1, the leftward movement of the clutch member 25 will tend to withdraw the friction shoe 57 away from the surface 54 of the casing by reason of the bevel 25ª bearing against the projection 55. This action is opposed by the pressure exerted by springs 60 located as shown in Fig. 4 in recesses 61 and 62 in the annular plate 51 and the clutch arm 52 respectively.

From the above it will be seen that when the gearing is employed for direct drive and it is desired to shift from this to a reduced speed, the withdrawal of the member 25 from engagement with the clutch arm will allow the friction clutch member 57 to tightly engage the casing by reason of the centrifugal force of the weighted arm and the pressure of the springs 60. Accordingly before the teeth 24 engage the teeth of the stationary ring, the rotation of the eccentric will be brought to practically zero speed resulting in the elimination of clashing between the teeth 24 and the stationary clutch member 34.

The position of the counterweight 63 extending from the clutch arm is nearly diametrically opposite the eccentric bearing and although the weight of the counterweight is less than the bearing it is sufficient to accurately balance the bearing when rotated at normal running high speeds. Therefore when the eccentric gearing is rigidly connected to the sleeve 20 for direct drive and the whole gearing is rotated as a unit, the center of gravity of the rotating mechanism will be practically coincident with the axis of rotation of the driving shaft or, in other words, in true dynamic balance. At slower speeds of rotation it is, of course, immaterial that the mechanism is not so accurately balanced. An ideal stabilized condition of the mechanism is thereby effected, which results in quiet transmission with continuously equalized loads on the bearings supporting the shafts.

I claim:

1. In combination a driving member and a driven member, a relatively stationary casing therefor, a pinion on the driving member, a revolving and circulating composite internal-external gear, an internal gear meshing with the external portion thereof and having a driving connection with the driven member, an eccentric bearing for the internal external gear, a dental clutch for connecting the eccentric with the casing to hold the bearing stationary and for connecting the eccentric bearing with the driving member to cause it to rotate therewith, and means including a centrifugal brake having counterweight carried by and overhanging the eccentric bearing for counterbalancing said eccentric and for causing the relative speeds of the eccentric and one of the members with which it connects to approach zero before being clutched together.

2. In combination, a driving member and a driven member, a pinion on the driving member, a composite internal-external gear arranged to be driven by the pinion, an internal gear meshing with the external portion thereof and having a driving connection with the driven member, an eccentric bearing for the internal-external gear, a clutch member for connecting the eccentric bearing with the driving member to cause it to rotate therewith, a clutch member coacting with the first clutch member for causing relative rotation between the eccentric bearing and driven member, and means including a centrifugal brake pivotally secured to the eccentric bearing member for decreasing the relative speed of rotation of the eccentric and one of the members to which the eccentric is to be clutched prior to the complete clutching engagement, said brake having an overhanging counterweight secured thereto for counter-balancing the eccentric.

3. In a transmission gearing in combination a casing, a driving member, a pinion on said member, a driven member, an internal gear member rigid therewith, an internal external gear permanently in mesh with said internal gear and said pinion, a rotatable bearing offset from the axis of rotation of the driving member and carrying said internal external gear, a clutch member for connecting the driving member with said eccentric bearing, a brake member positioned to bear against the casing for bringing said eccentric bearing to a stop when said clutch member is shifted to relieve the bearing from connection with the driving shaft, and a counterweight rigid with said brake member and opposite said eccentric having its center of gravity in substantially the same transverse radial plane with that of the eccentric bearing.

4. In a transmission gearing, a casing, a rotatable member having a pinion rigid therewith, another rotatable member having a gear rigid therewith, a composite gear eccentrically mounted and having teeth in mesh with the pinion and gear respectively, an eccentric bearing mounted to rotate about the axis of one of the members, dental means for causing the eccentric bearing to rotate with one of said members and for holding it against rotation relative to the casing and a brake controlled by said dental means, movably mounted on the eccentric and arranged to engage the casing prior to effecting one of said dental connections, said brake having a counterweight portion overhanging the bearing on the side of the pinion carrying member opposite the axis of rotation of the composite gear.

5. A driving and driven member, a pinion on one of the members, an internal-external gear, having teeth meshing with the pinion an internal gear meshing with the external teeth thereof and having a driving connection with the other of said members, an eccentric bearing for the internal-external gear, a clutch active to connect the eccentric bearing with one of the members to cause the bearing to be rotated with such member, a clutch member coacting with the first clutch member for preventing rotation of the eccentric bearing, and braking means for bringing the eccentric bearing to a stop before causing one of said clutching actions, said braking means being pivotally mounted on the eccentric bearing and overhanging the bearing to balance the eccentric while rotating.

6. In a transmission gearing, a casing, a rotating member and a shaft mounted therein, a gear on the shaft, and an internal-external gear connecting the two, an independently rotatable eccentric bearing surrounding the shaft for supporting the internal-external gear, means to connect the bearing and the shaft for preventing the normal operation of the gearing for transmitting a given speed from the shaft to the rotatable member, and clutch means for preventing relative rotation between the bearing and casing to secure another speed, said eccentric bearing having a friction brake associated therewith operable to decrease the relative speed of the bearing and casing previous to the operation of such last named clutching means and a counterweight rigid with the brake and overhanging the eccentric bearing to balance the eccentric while rotating.

7. In a gearing, a pair of rotatable members to be connected in different speed relations, pinion teeth rigid with one of the members, gear teeth rigid with the other member, a composite gear having teeth in mesh with the said pinion and gear teeth respectively, a rotatable eccentric bearing member for supporting the composite gear and maintaining the named teeth in mesh, movable clutch members arranged to couple one of said members with the eccentric bearing when moved in one direction and to couple the eccentric bearing with a stationary clutch member when moved in another direction, a movable brake carried by the eccentric bearing, resilient means for causing the brake to move outwardly into engagement with a stationary portion of the gearing to normally prevent the rotation of the eccentric bearing, and means on said movable clutch member whereby this clutch member releases the brake when the connection between the eccentric bearing and one of the cooperating clutch members is effected.

In testimony whereof, I hereunto affix my signature.

CHARLES E. F. AHLM.